(12) United States Patent
Maas et al.

(10) Patent No.: US 7,222,534 B2
(45) Date of Patent: May 29, 2007

(54) OPTICAL ACCELEROMETER, OPTICAL INCLINOMETER AND SEISMIC SENSOR SYSTEM USING SUCH ACCELEROMETER AND INCLINOMETER

(75) Inventors: Steven J. Maas, Austin, TX (US); D. Richard Metzbower, Austin, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 11/095,860

(22) Filed: Mar. 31, 2005

(65) Prior Publication Data

US 2006/0219009 A1 Oct. 5, 2006

(51) Int. Cl.
*G01P 15/00* (2006.01)
*G01V 7/00* (2006.01)

(52) U.S. Cl. .................... 73/514.26; 73/382 R (58) Field of Classification Search ............. 73/514.26, 73/514.29, 514.16, 514.27, 382 R, 382 G, 73/653; 367/149, 163; 250/227.19, 227.27
See application file for complete search history.

(56) References Cited

U.S. PATENT DOCUMENTS

| | | | |
|---|---|---|---|
| 4,270,050 A | 5/1981 | Brogardh | |
| 4,322,829 A | 3/1982 | Davis, Jr. et al. | |
| 4,403,144 A | 9/1983 | Stahan et al. | |
| 4,466,295 A | 8/1984 | Wesson | |
| 4,567,771 A | 2/1986 | Nelson et al. | |
| 4,592,235 A | 6/1986 | Fink | |
| 4,593,385 A | 6/1986 | Chamuel | |
| 4,628,175 A | 12/1986 | Nissi | |
| 4,637,255 A | 1/1987 | Martin | |
| 4,648,274 A | 3/1987 | Trainer | |
| 4,671,113 A | 6/1987 | Carome | |
| 4,678,905 A | 7/1987 | Phillips | |
| 4,710,760 A | 12/1987 | Kasday | |
| 4,726,650 A | 2/1988 | Grissom | |
| 4,739,661 A | 4/1988 | Bucholtz et al. | |
| 4,743,116 A | 5/1988 | Udd et al. | |
| 4,751,690 A | 6/1988 | Krueger | |
| 4,753,510 A | 6/1988 | Sezerman | |
| 4,755,051 A | 7/1988 | Cahill et al. | |
| 4,799,752 A | 1/1989 | Carome | |
| 4,800,267 A | 1/1989 | Freal et al. | |
| 4,860,586 A | 8/1989 | Miers et al. | |
| 4,876,447 A | 10/1989 | Killian | |
| 4,889,406 A | 12/1989 | Sezerman | |
| 4,897,541 A | 1/1990 | Phillips | |
| 4,900,918 A | 2/1990 | Killian | |
| 4,900,919 A | 2/1990 | Twerdochlib | |
| 4,930,862 A | 6/1990 | Miers et al. | |
| 4,989,148 A | 1/1991 | Gürke et al. | |

(Continued)

FOREIGN PATENT DOCUMENTS

GB 2 029 982 3/1980

*Primary Examiner*—Helen Kwok
(74) *Attorney, Agent, or Firm*—E. Eugene Thigpen; Richard A. Fagin (57) ABSTRACT

An optical accelerometer includes a beam and at least one optical fiber affixed to one side of the beam such that deflection of the beam changes a length of the optical fiber. A device for sensing the change in length of the optical fiber is functionally coupled to the at least one fiber. A seismic sensor system includes at least two accelerometers, oriented such that their sensitive axes are at least partially aligned along mutually orthogonal directions. Each accelerometer includes a beam, and at least one optical fiber affixed to one side of the beam such that deflection of the beam changes a length of the at least one optical fiber. A device for sensing the change in length of the optical fiber is functionally coupled to the at least one fiber of each accelerometer.

28 Claims, 6 Drawing Sheets

U.S. PATENT DOCUMENTS

| | | | |
|---|---|---|---|
| 5,061,069 A * | 10/1991 | Califano | 356/477 |
| 5,099,690 A | 3/1992 | Califano | |
| 5,134,882 A | 8/1992 | Taylor | |
| 5,155,548 A | 10/1992 | Danver et al. | |
| 5,195,162 A | 3/1993 | Sultan et al. | |
| 5,251,728 A | 10/1993 | Mund et al. | |
| 5,276,322 A | 1/1994 | Carome | |
| 5,336,983 A | 8/1994 | Watanabe | |
| 5,369,485 A | 11/1994 | Hofler et al. | |
| 5,420,688 A | 5/1995 | Farah | |
| 5,473,459 A | 12/1995 | Davis | |
| 5,481,459 A | 1/1996 | Büngeler | |
| 5,611,731 A | 3/1997 | Bouton et al. | |
| 5,625,724 A | 4/1997 | Frederick et al. | |
| 5,663,960 A | 9/1997 | Le Guen et al. | |
| 5,705,809 A | 1/1998 | Kershaw | |
| 5,721,681 A | 2/1998 | Borschert et al. | |
| 5,837,998 A | 11/1998 | Dinev et al. | |
| 5,883,308 A | 3/1999 | Fersht | |
| 5,891,747 A | 4/1999 | Farah | |
| 5,903,349 A | 5/1999 | Vohra et al. | |
| 5,936,294 A | 8/1999 | Zhang | |
| 6,008,898 A | 12/1999 | Furstenau et al. | |
| 6,018,390 A | 1/2000 | Youmans et al. | |
| 6,056,032 A | 5/2000 | Vohra et al. | |
| 6,160,762 A * | 12/2000 | Luscombe et al. | 367/149 |
| 6,175,108 B1 * | 1/2001 | Jones et al. | 250/227.14 |
| 6,314,371 B1 | 11/2001 | Monk | |
| 6,328,837 B1 | 12/2001 | Vohra et al. | |
| 6,346,985 B1 | 2/2002 | Hall | |
| 6,384,919 B1 | 5/2002 | Fersht et al. | |
| 6,426,947 B1 | 7/2002 | Banker et al. | |
| 6,549,488 B2 | 4/2003 | Maas et al. | |
| 6,550,330 B1 | 4/2003 | Waters et al. | |
| 6,563,998 B1 | 5/2003 | Farah et al. | |
| 6,567,174 B1 | 5/2003 | Barker et al. | |
| 6,575,033 B1 | 6/2003 | Knudsen et al. | |
| 6,581,465 B1 | 6/2003 | Waters et al. | |
| 6,650,418 B2 | 11/2003 | Tweedy et al. | |
| 6,671,055 B1 | 12/2003 | Wavering et al. | |
| 6,763,718 B1 | 7/2004 | Waters et al. | |
| 6,779,402 B2 | 8/2004 | Rud et al. | |
| 6,789,424 B2 | 9/2004 | Knudsen et al. | |
| 6,807,328 B2 | 10/2004 | Farah | |
| 6,832,023 B1 | 12/2004 | Gaylord et al. | |
| 6,853,934 B2 | 2/2005 | Nagamatsu | |
| 6,867,411 B2 | 3/2005 | Kelleher et al. | |
| 6,886,404 B2 | 5/2005 | Digonnet et al. | |
| 6,891,621 B2 | 5/2005 | Bert et al. | |
| 6,898,970 B2 | 5/2005 | Berstis | |
| 6,901,176 B2 | 5/2005 | Balachandran et al. | |
| 6,955,085 B2 * | 10/2005 | Jones et al. | 73/514.26 |

* cited by examiner

FIG. 12

OPTICAL ACCELEROMETER, OPTICAL INCLINOMETER AND SEISMIC SENSOR SYSTEM USING SUCH ACCELEROMETER AND INCLINOMETER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of optical acceleration and inclination sensing devices. More particularly, the invention relates to optical accelerometers and inclinometers used for, but not limited to, sensing seismic energy.

2. Background Art

Optical devices for sensing parameters such as acceleration, motion and/or pressure are used for, among other purposes, sensing seismic energy from the Earth's subsurface. The seismic energy may be naturally occurring, or may be imparted by a seismic energy source for the purpose of performing reflection seismic surveys. Detecting seismic energy may include detecting pressure, or changes in pressure, in a body of water. A sensor used to measure such changes in pressure is known as a hydrophone. Detecting seismic energy also includes detecting motion on or near the Earth's surface. Motion may be detected using devices known as geophones. Geophone signals are related to velocity of motion. Accelerometers, which produce signals related to the time derivative of velocity of motion (acceleration), are also used to detect seismic energy. Inclinometers, which produce signals related to the relative orientation of a device with respect to Earth's gravitational pull, are used to generate data in the location of a device with respect to level and other sensors in the system. Sensors known in the art which respond to the foregoing physical parameters generate an optical signal in response to the detected physical parameter. The optical signal may be, for example, a change in reflected wavelength, a change in phase or an interference pattern in response to changes in the physical parameter.

Generally, optical sensors known in the art include a selected length of optical fiber affixed to a device that changes shape in response to changes in the physical parameter being detected. The change in shape of the device is transformed into a change in length of the optical fiber. Change in length of the optical fiber may be detected by one of a number of different optical measurement techniques. Such techniques include change in reflected wavelength of light as a result of a change in wavelength of a Bragg grating formed in the optical fiber, or optical coupling of a light beam transmitted through the optical fiber with a light beam transmitted through another optical fiber, known as a "reference fiber." The reference fiber may be disposed such that its length remains essentially unchanged irrespective of the value of the physical parameter. Light beams from the fiber affixed to the device, and the reference fiber, are coupled in an optical interferometer. An interference pattern or phase change in the light generated in the optical interferometer is related to the change in length of the fiber coupled to the device, and thus to the physical parameter being measured. Typically the output of the interferometer is coupled to a photodetector, which generates an electrical signal related to the light amplitude applied to the photodetector.

A fiber optic hydrophone is disclosed, for example, in U.S. Pat. No. 5,625,724 issued to Frederick et al. The hydrophone disclosed in the '724 patent includes a reference fiber wrapped around a rigid inner cylinder. A solid layer of compliant material is applied over the reference fiber. The sensing arm of the interferometer is wound over the layer of material applied over the reference fiber. The outer material is sufficiently compliant to provide acoustic sensitivity comparable to that of air-backed hydrophones. Another fiber optic hydrophone is disclosed in U.S. Pat. No. 6,549,488 issued to Maas et al. and assigned to the assignee of the present invention. A hydrophone according to the Maas et al. '488 patent includes a compliant sensing mandrel coaxial with and adjacent to a rigid reference mandrel. A first optical fiber is wound around the compliant sensing mandrel. A second optical fiber is wound around the reference mandrel. The first and second optical fibers comprise different arms of an interferometer. Flexible sealing members, such as O-rings, seal the compliant sensing mandrel to the rigid reference mandrel. In one embodiment, one O-ring is disposed near each end of the sensing mandrel. A cylindrical support member is disposed inside the sensing mandrel. At least a portion of the support member is spaced from the sensing mandrel so as to provide a sealed cavity between the sensing mandrel and the support member. The sealed cavity is filled with air or similar compliant substance.

U.S. Pat. No. 5,369,485 issued to Hofler et al. discloses an optical accelerometer wherein an elastic disk and a predetermined mass are supported by a body for flexure of the disk due to acceleration, shock, vibration and displacement of the body in a direction axially of the disk. Such a disk, or a plurality of such disks, are wound with a pair of flat spirals of optical fiber, each spiral being fixedly attached to a corresponding disk side so that disk flexure lengthens a spiral on one disk side and shortens a spiral on another disk side. Such spirals on oppositely facing disk sides are connected as opposite legs of a fiber optical interferometer so that the interferometer provides an output corresponding to the amplitude of the flexure. A push-pull pair of the spirals may be disposed oppositely of a thermally conducting disk to minimize temperature differences between the push-pull spiral pair. An accelerometer according to the disclosure in the Hofler et al. patent is constructed with a centrally supported disk having the mass distributed around the disk periphery. Such construction is purported to be advantageous for isolation from mounting stress and for providing a plurality of coaxially mounted disks for increased sensitivity.

U.S. Pat. No. 6,650,418 issued to Tweedy et al. discloses a fiber optic sensor that includes a flexural disk having a pair of fiber optic coils mounted on opposite sides thereof and optically coupled together to form an interferometer that produces an output signal in response to acceleration of the flexural disk. The accelerometer includes a housing having first and second end plates with a sidewall extending between the end plates. The sidewall has an inwardly facing groove in which an outer edge portion of the flexural disk is mounted. A compressive damper is mounted in the housing and arranged to exert a compressive force on the flexural disk to control movement thereof in response to acceleration of the flexural disk along a sensing axis and thereby control the output signal.

U.S. Pat. No. 6,575,033 issued to Knudsen et al. discloses a highly sensitive accelerometer, which includes a mass within a housing suspended by opposing support members. The support members are alternately wound around a pair of fixed mandrels and the mass in a push-pull arrangement. At least a portion of one of the support members comprises optical fiber coils as the support members for use in interferometric sensing processes.

More recently, multiple-direction sensitive ("multicomponent") motion sensors, in conjunction with substantially collocated hydrophones ("dual sensor OBCs"), have been used on the bottom of a body of water for marine seismic surveying. See, for example, U.S. Pat. No. 6,314,371 issued to Monk, which discloses a method for processing of dual sensor OBC data that corrects for energy incidence angle, corrects for estimated reflectivity, and combines corrected seismic sensor traces using an optimal diversity scaling technique. In one embodiment, the disclosed method takes seismic traces from a geophone and a hydrophone, corrects the geophone trace for the incidence angle, determines diversity filters for optimally combining the geophone and hydrophone traces, applies the diversity filters, estimates a reflectivity coefficient for the ocean bottom (potentially for different angles of reflection), scales the geophone data according to the reflectivity, and re-applies the diversity filters to obtain a combined trace. The combined trace is expected to have various artifacts eliminated, including ghosting and reverberation, and is expected to have an optimally determined signal-to-noise ratio.

It is important that motion sensors in general, and in particular those sensors used in dual sensor OBCs, have good sensitivity, are relatively insensitive to noise, and have good rejection of cross-component signal (meaning that the motion sensors are substantially insensitive to motion along any direction other than the sensitive axis). Accordingly, there is a continuing need for motion and/or acceleration sensors that have improved sensitivity, reduced noise and reduced cross-component sensitivity.

SUMMARY OF THE INVENTION

One aspect of the invention is an optical accelerometer. An accelerometer according to this aspect of the invention includes a beam and at least one optical fiber affixed to one side of the beam such that deflection of the beam changes a length of the optical fiber. Means for sensing the change in length of the optical fiber is functionally coupled to the at least one fiber.

Another aspect of the invention is a seismic sensor system. A system according to this aspect of the invention includes at least two accelerometers. Each accelerometer comprises a beam and at least one optical fiber affixed to one side of the beam such that deflection of the beam changes a length of the optical fiber. The at least two accelerometers are oriented so as to be sensitive to acceleration at least in part along mutually orthogonal directions. Means for sensing the change in length of the optical fiber in each of the accelerometers is functionally coupled to each fiber.

Another aspect of the invention is a gravity orientation system. A system according to this aspect of the invention includes three accelerometers, each accelerometer having a beam and at least one optical fiber affixed to one side of the beam such that deflection of the beam changes a length of the optical fiber. The at least three accelerometers are each oriented to be sensitive to acceleration at least in part along mutually orthogonal directions. The at least one fiber in each accelerometer comprises a Bragg grating thereon, such that an orientation with respect to Earth's gravity of a deflecting axis of each beam is determinable by measurement of a change in wavelength of light reflected by the Bragg grating. By so measuring the change in length of the Bragg grating, an orientation of each accelerometer, and thus the system, with respect to Earth's gravity is determinable.

Other aspects and advantages of the invention will be apparent from the following description and the appended claims.

DETAILED DESCRIPTION

Figure 1:
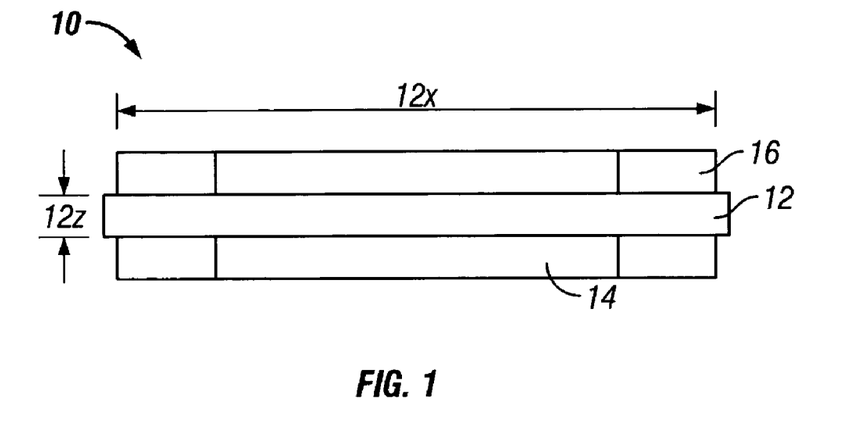
FIG. 1 shows a side view of one embodiment of an accelerometer according to the invention.

Generally, accelerometers according to the various aspects of the invention work on the principle of the deflecting beam, where the beam is typically supported at its longitudinal ends. Supporting the beam at its longitudinal ends substantially prevents beam flexure in any direction transverse to the plane of the beam. FIG. 1 shows one embodiment of an accelerometer beam assembly 10 including a beam 12 which may be made from plastic or other suitable material subject to elastic strain under acceleration. The beam 12 has dimensions shown in FIG. 1 by 12X, which is the length or longitudinal dimension, and 12Z which is the thickness dimension. The plane of the beam 12 is transverse to the thickness dimension 12Z. The dimensions 12X and 12Z should be selected to enable relatively free flexure in the direction of the thickness 12Z, while substantially preventing any flexure of the beam along the longitudinal dimension 12X. The embodiment shown in FIG. 1 includes an optical fiber 14 affixed to one face or side of the beam 12. Affixing the fiber 14 to the beam 12 may be performed by adhesive bonding or similar technique.

In the embodiment of FIG. 1, a second optical fiber 16 is shown affixed to the opposite face of the beam 12. As the beam 12 deflects under acceleration along the direction of the thickness 12Z, the optical fibers 14, 16 are stretched or compressed, depending on the direction of deflection of the beam 12. The stretching and compression of the one fiber 14 is in opposed polarity to that of the other fiber 16 because they are disposed on opposite sides of the beam 12. Such arrangements are known as "push-pull" connections of optical fibers.

A signal from the accelerometer related to the acceleration applied thereto is generated by determining a change in length of the optical fiber 14, if only one fiber is used, or of both fibers 14, 16. In practical embodiments, measurement of the change in length of the fiber may be performed by an optical interferometer. The optical connections and use of the fibers 14, 16 as part of an interferometer to generate an acceleration-responsive signal will be explained below with reference to FIGS. 5 and 5A. It should be understood that an accelerometer according to the invention requires only one optical fiber affixed to one face or the other of the beam, such as fiber 14 or 16. The dual-fiber embodiment of FIGS. 1 and 2 is intended to have increased sensitivity as compared to that expected from a single fiber implementation.

Figure 2:
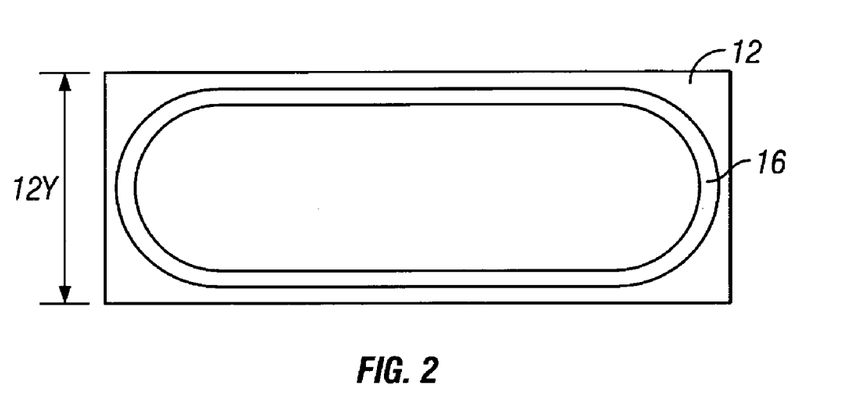
FIG. 2 shows a top view of the accelerometer shown in FIG. 1.

FIG. 2 shows a top view of the accelerometer beam assembly 10. The beam 12 has a width dimension 12Y. As shown in FIG. 2, the optical fiber 16 may be arranged about the face of the beam 12 in a generally oval shape to maximize the amount of fiber disposed along the longitudinal dimension (12X in FIG. 1), while minimizing the degree of bending within the fiber 16 so as to minimize optical losses in the fiber 16. The width dimension 12Y should be selected to make the beam 12 rigid enough along the width direction to resist flexure, but no too large as to induce any appreciable degree of bending or twisting in the beam 12 under oblique acceleration.

Figure 3:
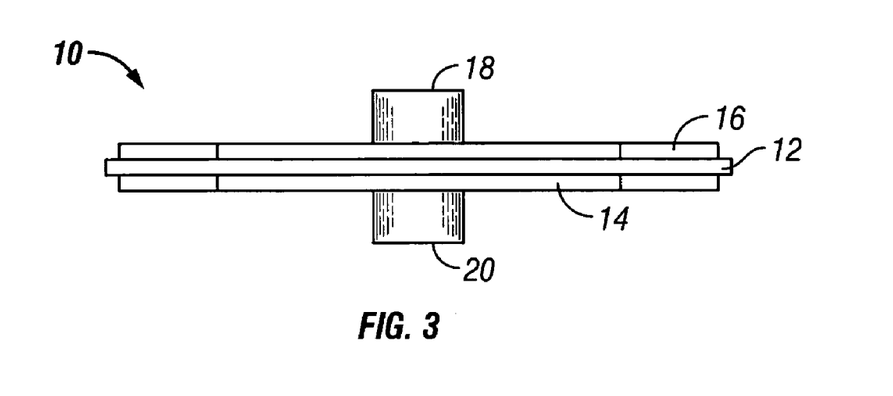
FIG. 3 shows a side view of another embodiment of an accelerometer.

Another embodiment of an accelerometer beam assembly, shown in FIG. 3, can include a reactive mass 18, 20 affixed to one or both faces of the beam 12, generally in the center thereof. The masses 18, 20 increase the amount of deflection of the beam 12 under any given amount of acceleration, and thus, increase the overall sensitivity of the accelerometer.

Figure 4:
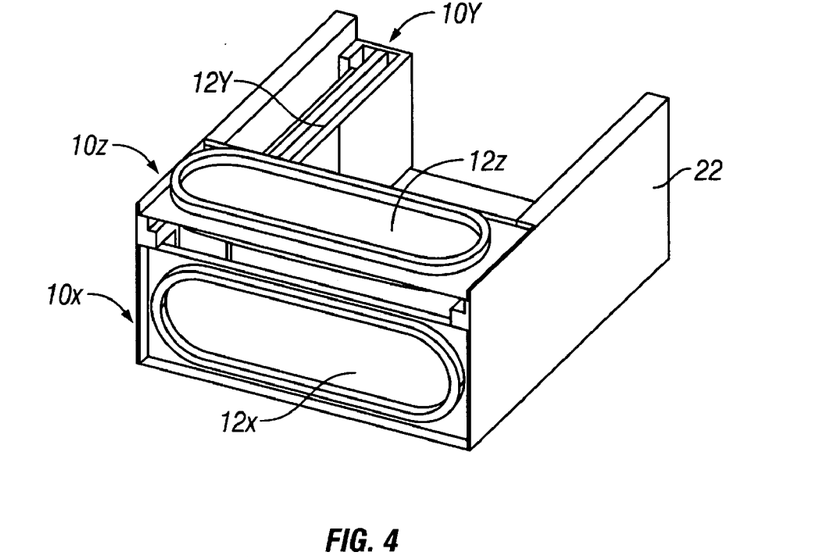
FIG. 4 shows an oblique view of a multicomponent seismic sensor system according to another aspect of the invention.

A practical multicomponent seismic sensor system may be made from a plurality of accelerometers such as explained with reference to FIGS. 1 through 3. FIG. 4 shows one embodiment of such a multicomponent seismic sensor system. The system includes three optical accelerometers, 10X, 10Y, 10Z, each oriented such that its sensitive direction is along a mutually orthogonal direction from those of the other two accelerometers. Having the accelerometers be mutually orthogonal facilitates determining the direction from which detected seismic energy originates, however, it should be understood that mutual orthogonality of the accelerometers is a matter of convenience in the design of the seismic sensor system. Other arrangements of the sensitive axes of the accelerometers may be used in different embodiments, while maintaining the capability of determining direction of origin of seismic energy.

The accelerometers 10X, 10Y, 10Z may be enclosed in a waterproof, pressure resistant enclosure 22, enabling the system to be submerged in liquid. Such would be then case when the system is used in a marine seismic survey system or in a permanent sensor installation such as would be used on the sea floor or in a wellbore.

Figure 5:
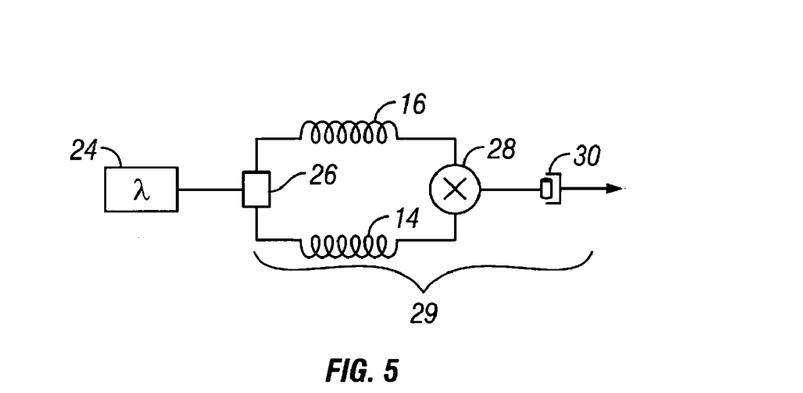
FIG. 5 shows one embodiment of an interferometer used to determine change in length of fibers in various accelerometer embodiments.

One embodiment of an optical interferometer and associated components used to generate an acceleration-responsive signal from beam deflection is shown at 29 in FIG. 5.

The optical fibers 14, 16 attached to opposite sides of the beam (12 in FIG. 1) are each shown optically coupled at one end to a beam splitter 26, and coupled at the other end to a combiner 28. A light source, such as a laser diode 24 is coupled to the input of the beam splitter 26 and provides the laser light to each fiber 14, 16. A photodetector 30 is coupled to the output of the interferometer 29, and produces an electrical signal corresponding to the optical signal generated in the interferometer 29. Thus, deflection of the beam (12 in Figure) under acceleration along the thickness direction (12Z in FIG. 1) is converted into an electrical signal. Depending on the particular arrangement of a seismic sensor system, the laser diode 24 and photodetector 30 may be disposed at the Earth's surface or water surface, and the beam splitter 26 and combiner 28 disposed near the accelerometer(s) (12 in FIG. 1). However, other embodiments may locate the laser diode and beam splitter proximate the interferometer, such as in the enclosure (22 in FIG. 4). The optical interferometer system shown in FIG. 5 is generally known as a Mach-Zehnder interferometer.

Figure 5A:
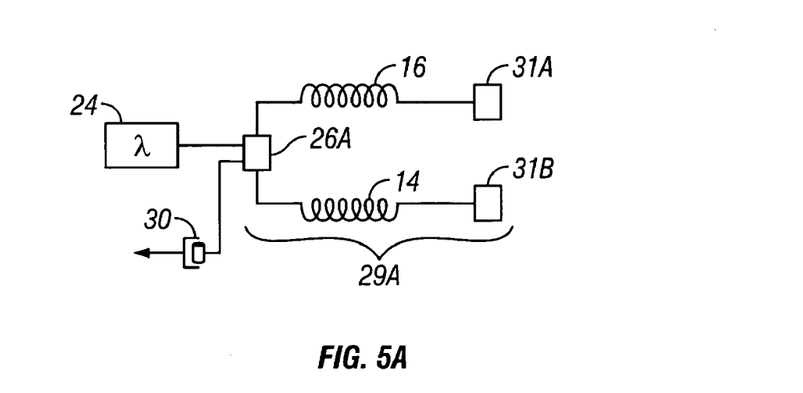
FIG. 5A shows an alternative arrangement of interferometer.

Alternatively, as shown in FIG. 5A, a Michelson interferometer may be used. The Michelson interferometer 29A is made by substituting the combiner (28 in FIG. 5) with mirrors 31A and 31B at the distal ends of each fiber 14, 16. Light passing through the fibers 14, 16 is reflected back by the mirrors 31A, 31B. The back reflected light is recombined in the beam splitter 26A such that phase shift and/or interference pattern may be detected by the photodector 30.

Other types of interferometers that can be used with various embodiments of accelerometer include Fabry-Perot and Sagnac interferometers. In embodiments which use a Fabry-Perot interferometer, the fiber (either 14 or 16 in FIG. 1) affixed to one or the opposite face of the beam may be excluded. The remaining fiber (16 or 14 in FIG. 1) may include a Bragg grating thereon where the fiber is affixed to the beam (12 in FIG. 1) to enable determining a change in length of the fiber by measuring change in wavelength of back-reflected light through the fiber. Accordingly, the particular interferometer system used in various embodiments is not a limitation on the scope of the invention. A particular application for a Bragg grating on one or both fibers 14, 16 will be explained below with reference to FIG. 8.

Figure 6:
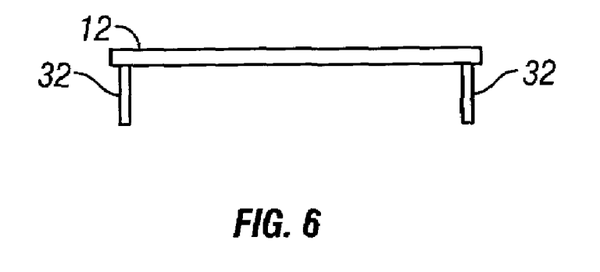
FIG. 6 shows an accelerometer beam supported at both longitudinal ends.

FIG. 6 shows a lateral view of the beam 12 and supports 32 at the longitudinal ends of the beam 12. By supporting the beam 12 at its longitudinal ends, and by suitable dimensions (12X, 12Z in FIGS. 1 and 12Y in FIG. 2) flexure of the beam 12 will be substantially limited to the thickness dimension (12Z in FIG. 1). Thus limiting flexure of the beam 12 provides the accelerometer beam assembly (10 in FIG. 1) with a high degree of cross-component rejection or insensitivity. Initial evaluation of the accelerometer as shown in FIG. 1 indicates a cross-component rejection of greater than 30 dB.

Figure 7:
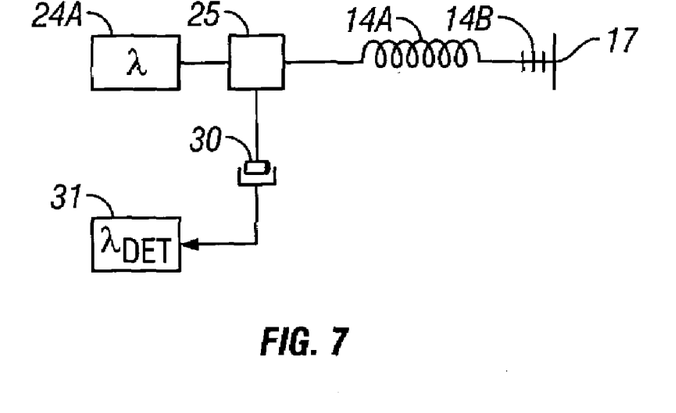
FIG. 7 shows a particular embodiment of an accelerometer beam.

As will be readily appreciated, rigidly, fixedly supporting the beam 12 at both longitudinal ends can provide a high degree of cross component rejection, but may limit the amount of beam deflection (and thus sensitivity) in the thickness direction. Beam deflection would be limited in such cases because the beam would necessarily have to elongate along the longitudinal direction (12X in FIG. 1) if the beam is rigidly, fixedly supported at both ends. To increase the amount of deflection while maintaining high cross component rejection, an arrangement such as shown in FIG. 7 may be used to support the beam 12 at its longitudinal ends. Mounting holes 13 at one end may be provided for cap screws or the like. The other end may include elongated openings 15 such that under flexure, when the longitudinal dimension would be reduced by a proportionate amount, the other end of the beam 12 is free to move longitudinally, but substantially not transversely to the longitudinal direction.

Figure 8:
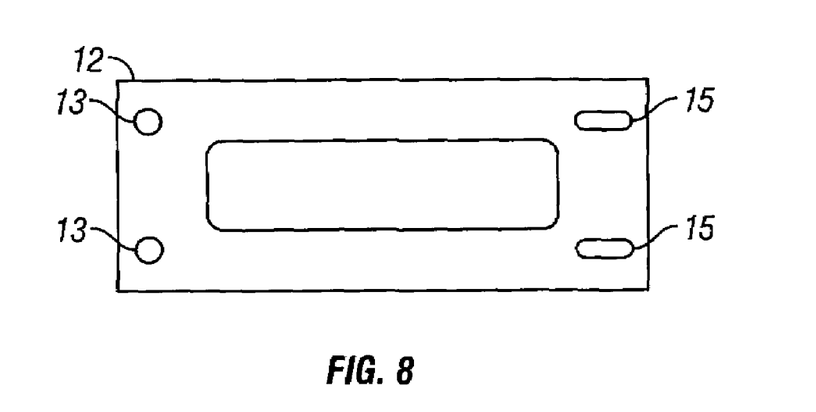
FIG. 8 shows an embodiment of optical detection system used to determine gravity orientation (inclinometer) of an accelerometer.

FIG. 8 shows a particular embodiment, which may be used to determine an orientation of the accelerometer with respect to Earth's gravity as well as make acceleration measurements. A fiber 14A includes a Bragg grating 14B thereon. The fiber 14A can be affixed to a beam substantially as explained with reference to FIG. 1. A light source 24A, such as a laser diode, is optically coupled to one end of the fiber 14A through a beam splitter 25. The fiber 14A may include a mirror 17 at its other end. A photodetector 30 is coupled to the other output of the beam splitter 25. The output of the photodetector 30 may be coupled to a spectral analyzer 31. Thus, the wavelength of light reflected by the Bragg grating 14B is related to the degree of elongation of the Bragg grating 14B. The accelerometer may be used to determine the orientation thereof by calibrating the Bragg grating reflected wavelength both at zero gravity and at unity (100% gravity). Measurements of the reflected light wavelength can be related to orientation of the accelerometer with respect to gravity by well known trigonometric relationships.

In the present embodiment, the accelerometer may be calibrated to zero gravity by orienting the beam (12 in FIG. 1) such that the thickness, or deflecting, dimension of the beam (12Z in FIG. 1) is oriented transversely to Earth's gravity. A wavelength of light reflected by the Bragg grating 14B is measured by the spectral analyzer 31. Then the beam is oriented such that its deflecting direction (12Z in FIG. 1) is directly along Earth's gravity, and the wavelength of the light reflected by the Bragg grating 14B is again measured. The wavelength of the light reflected by the Bragg grating 14B will change as the fiber 14A is lengthened by deflection of the beam, and consequent elongation of the Bragg grating 14B. The relative orientation of the accelerometer with respect to Earth's gravity will thus be related to the light wavelength reflected from the Bragg grating 14B. The optical components described with reference to FIG. 8 may be included as a separate fiber in any particular accelerometer, or, as shown in FIG. 8, may be included in the same fiber used in the accelerometer sensor.

Figure 9:
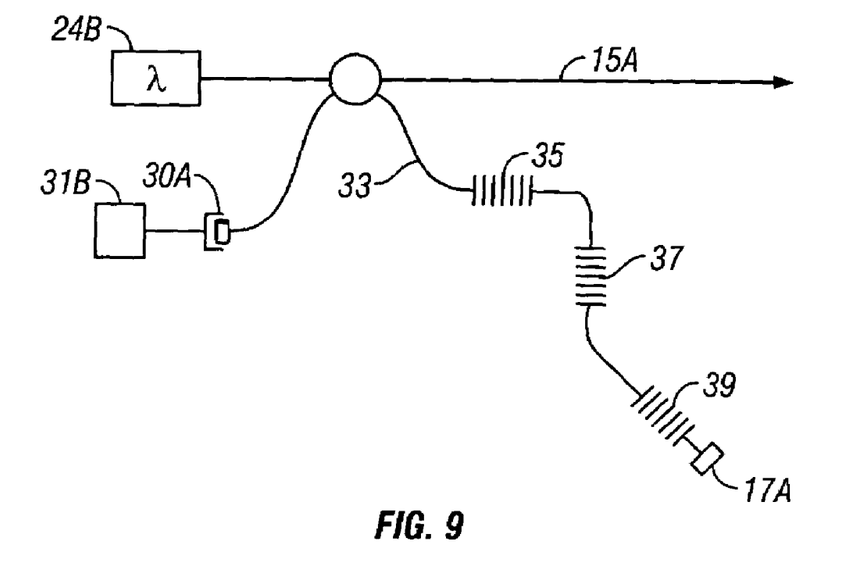
FIG. 9 shows an alternative embodiment of inclinometer.

In a multicomponent sensor system, such as shown in FIG. 4, three mutually orthogonal accelerometers may each include a fiber having a Bragg grating thereon. Associated optical components can be used to enable determining a change in length of the grating, as shown in FIG. 9. In the embodiment of FIG. 9, a single optical fiber 33 may include three separate Bragg gratings 35, 37, 39 thereon. Each Bragg grating 35, 37, 39 is affixed to one of the three accelerometer beams, as will be explained with reference to FIG. 10. A mirror 17A at the end of the fiber may be used to reflect light. Each Bragg grating 35, 37, 39 will be elongated, and thus reflect a particular wavelength of light, based on the orientation of the corresponding accelerometer beam with respect to Earth's gravity. Thus, the orientation of the sensor system may be inferred by measurement of the wavelength of the Bragg grating output of each of the three Bragg gratings 35, 37, 39, and thus the orientation of each accelerometer with respect to gravity. Orientation of the entire sensor system with respect to gravity may be determined from the three individual accelerometer gravity component measurements using well known trigonometric relationships. Some embodiments of the accelerometer beam according to the embodiment of FIG. 9 may include one or more reactive masses coupled thereto, such as shown in FIG. 3.

Figure 10:
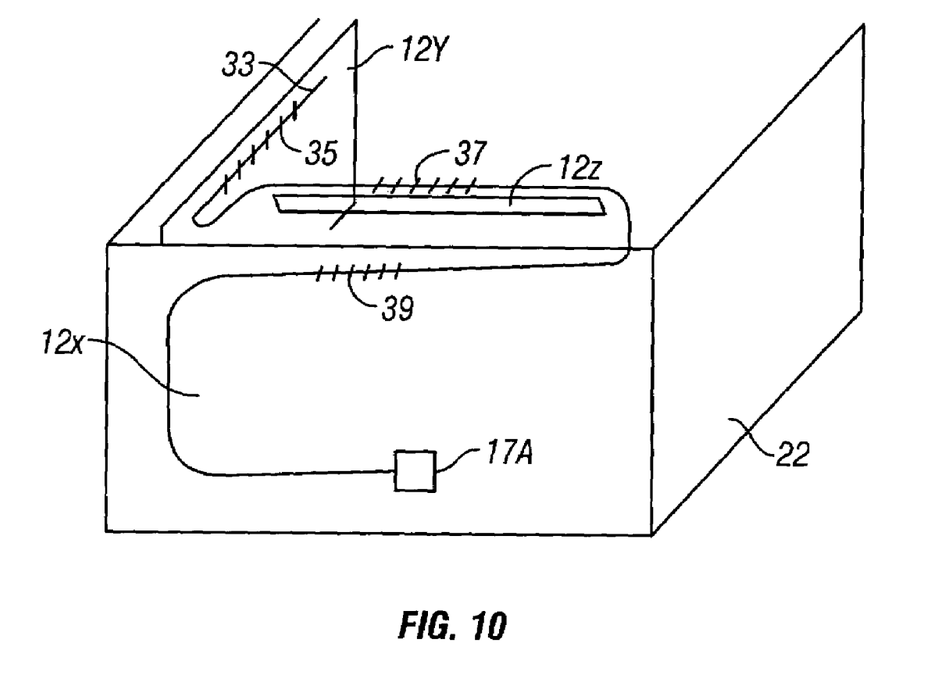
FIG. 10 shows the embodiment of inclinometer shown in FIG. 9 as mounted in a sensor system according to FIG. 4.

FIG. 10 shows the single fiber embodiment of inclinometer of FIG. 9 in which each Bragg grating 35, 37, 39 in the fiber 33 is affixed to a corresponding one of the accelerometer beams 12Y, 12Z, 12X. Each beam 12Y, 12X, 12Z will deflect in relation to the orientation of each beam with respect to Earth's gravity. If a particular beam is transverse to gravity, its deflection from gravity will be substantially zero. Maximum deflection, and corresponding change in the length of the associated Bragg grating, will occur when an accelerometer beam's deflection direction is substantially aligned with Earth's gravity. Orientation can be inferred by well known formulas using measurements of orthogonal components of Earth's gravity. In the embodiment of FIG. 10, the accelerometer beams may be oriented substantially orthogonally. Other embodiments may include a separate fiber for each Bragg grating, or may include a Bragg grating on the same sensing fibers used in one or more types of interferometer for sensing seismic energy, as explained with reference to FIGS. 1-4.

Figure 11:
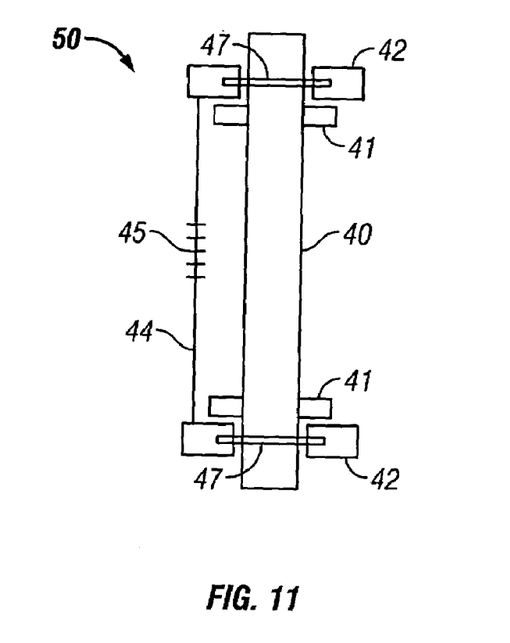
FIG. 11 shows an alternative embodiment of an inclinometer.

Another embodiment of an inclinometer 50, shown in FIG. 11, can provide increased strain in a fiber Bragg grating with respect to Earth's gravitational pull by mass loading the fiber Bragg grating directly. Such direct mass loading can increase the accuracy of the measurement of inclination. As shown in FIG. 11, linear bearings, or some other high precision constraining device, 47 enable masses 42, 43 to slide along a frame or rod 40 as a result of the force created by Earth's gravity. Coupling a fiber 44 having a Bragg grating thereon to the bearings 47, and thus operatively to the masses 42, 43, and adding a positive stop or snubber 41 to each end of the portion of the rod 40 for which mass travel is permitted enables for the Bragg grating 45 to be strained by either one of the masses 43, 42, regardless of orientation of the device with respect to gravity. For example, in the orientation shown in FIG. 11, the upper mass 42 is stopped by the snubber 41, while the lower mass 43 can moved when pulled by gravity so as to strain the fiber 44. If the accelerometer is rotated so that the lower mass 43 is above the upper mass 42, the lower mass 43 will be stopped by the snubber 41, and the upper mass 42 will move when loaded by gravity. Pulling directly on the fiber 44, as shown in FIG. 11, can induce more strain in the Bragg grating 45 creating a greater wavelength shift. Because the masses 42, 43 travel along the rod 40 on linear bearings, the masses 42, 43 are substantially prevented from movement other than along the rod 40. By limiting motion of the masses 42, 43 to along the rod, 40, the inclinometer 50 is substantially sensitive only to the component of acceleration (i.e., Earth's gravity) acting along the length of the rod 40, and thus has high cross component rejection. The inclinometer 50 shown in FIG. 11 can be calibrated substantially as explained above with reference to FIG. 9.

Figure 11A:
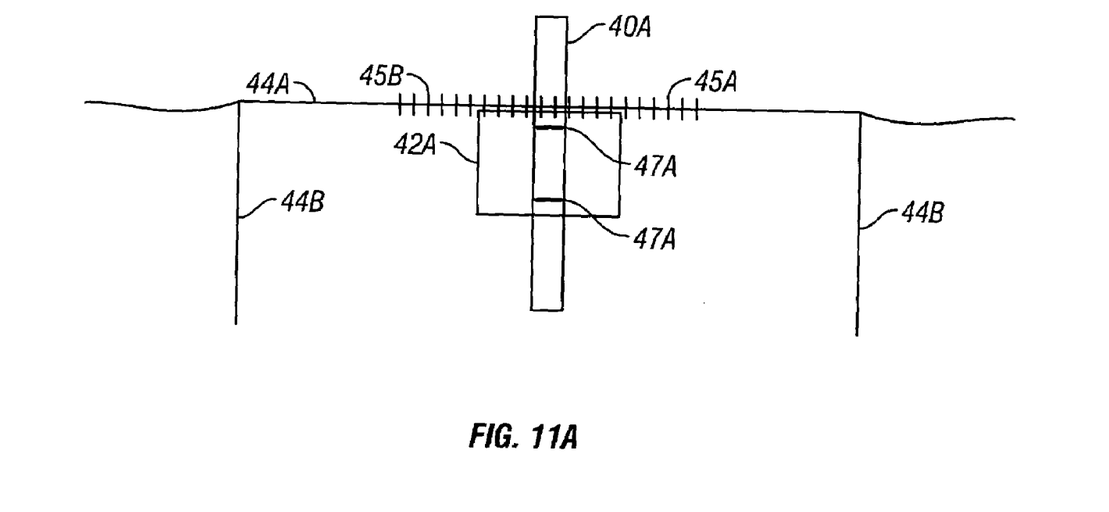
FIG. 11A shows an alternative embodiment of an inclinometer that works on a similar principle to the device shown in FIG. 11.

An alternative arrangement of an inclinometer that works generally on the same principle as the device shown in FIG. 11 is shown schematically in FIG. 11A. A mass 42A is suspended along a rod 40A by linear bearings 47A, such that the mass 42A can move along the direction of the rod 40A, but is substantially restrained from movement in any other direction. An optical fiber 44A having a Bragg grating 45A thereon is coupled to the mass 42A such that the mass 42A is disposed along the fiber 44A between two fiber suspension points 44B. The fiber 44A is also affixed to the suspension points 44B. As gravity acts on the mass 42A, it pulls on the fiber 44A and causes its length to change, which is detectable by change in the light reflection wavelength of the Bragg grating 45A. In principle of operation and calibration, the device shown in FIG. 11A operates substantially similarly to the device shown in FIG. 11. The embodiment shown in FIG. 11A has the advantage of being operable in any orientation with respect to gravity using only a single mass and requiring no snubbers as does the device shown in FIG. 11.

Figure 12:
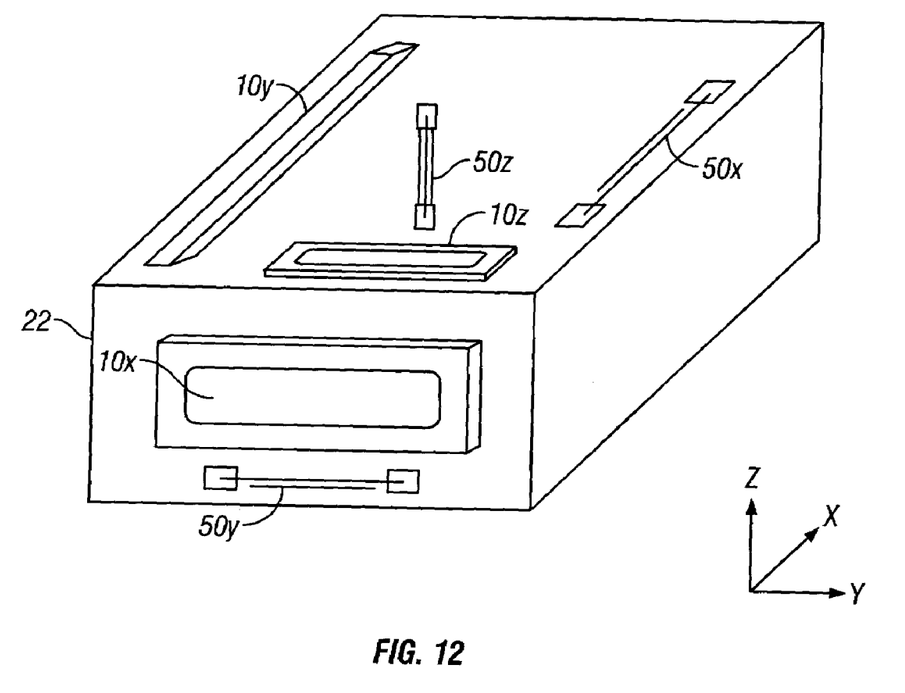
FIG. 12 shows an example multicomponent seismic sensor system including inclinometers as shown in FIG. 11.

FIG. 12 shows an embodiment of a multicomponent seismic sensor system including three, mutually orthogonal inclinometers 50X, 50Y, 50Z, and three mutually orthogonal accelerometers 10X, 10Y, 10Z. The system in FIG. 12 is similar in operating principle to that shown in FIG. 10, however the inclinometers 50X, 50Y, 50Z are of the kind explained with reference to FIG. 11. The references X, Y and Z relate to the individual sensitive axes of the sensor system, which by convention may be labeled such that ordinarily horizontally disposed axes are X and Y, and the vertically disposed axis is Z. The system may be disposed in a water tight enclosure 22 as are other embodiments, such as explained with reference to FIG. 4 and FIG. 10.

Optical accelerometers, optical inclinometers, and sensor systems made with such accelerometers according to the invention may provide improved sensitivity, improved cross-component rejection and improved reliability over electrical and optical accelerometers known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An accelerometer, comprising:
a frame;
a beam supported at longitudinal ends thereof in the frame;
at least one optical fiber affixed to one side of the beam such that deflection of the beam changes a length of the optical fiber; and
means for sensing the change in length of the optical fiber.

2. The accelerometer of claim 1 further comprising an additional optical fiber affixed to the other side of the beam such that deflection of the beam changes a length of the additional fiber opposite in polarity to the change in length of the at least one optical fiber affixed to the one side of the beam.

3. The accelerometer of claim 1 further comprising a mass affixed to the beam such that a magnitude of the deflection of the beam is increased with respect to a magnitude of an acceleration applied to the beam.

4. The accelerometer of claim 1 wherein the means for sensing comprises a Michelson interferometer.

5. The accelerometer of claim 1 wherein the means for sensing comprises a Fabry-Perot interferometer.

6. The accelerometer of claim 1 wherein the means for sensing comprises a Mach-Zehnder interferometer.

7. The accelerometer of claim 1 further comprising a light wavelength sensor optically coupled to the at least one fiber, and wherein the at least one fiber comprises a Bragg grating thereon, such that an orientation with respect to Earth's gravity of a deflecting axis of the beam is determinable by measurement of a change in wavelength of light reflected by the Bragg grating.

8. The accelerometer of claim 1 further comprising a second optical fiber affixed to the beam such that deflection of the beam changes a length of the second fiber, the second fiber having a Bragg grating thereon, the second fiber optically coupled to a wavelength detector such that an orientation of the accelerometer with respect to Earth's gravity is determinable by measurement of a change in wavelength of light reflected by the Bragg grating.

9. The accelerometer of claim 1 at least one longitudinal end being supported so as to enable longitudinal movement when the beam is deflected.

10. A multicomponent seismic sensor system, comprising:
at least two accelerometers, each accelerometer comprising a beam and at least one optical fiber affixed to one side of the beam such that deflection of the beam changes a length of the optical fiber, the at least two accelerometers oriented to be sensitive to acceleration at least in part along mutually orthogonal directions, each beam supported at longitudinal ends thereof in a frame; and
means for sensing the change in length of the optical fiber in each of the accelerometers.

11. The system of claim 10 wherein each accelerometer further comprises:
an additional optical fiber affixed to the other side of the beam such that deflection of the beam changes a length of the additional fiber opposite in polarity to the change in length of the at least one optical fiber affixed to the one side of the beam.

12. The system of claim 10 further comprising a mass affixed to each beam such that a magnitude of the deflection of each beam is increased with respect to a magnitude of an acceleration applied to each beam.

13. The system of claim 10 wherein the means for sensing comprises a Michelson interferometers.

14. The system of claim 10 wherein the means for sensing comprises a Fabry-Perot interferometers.

15. The system of claim 10 wherein the means for sensing comprises a Mach-Zehnder interferometers.

16. The system of claim 10 further comprising a light wavelength sensor optically coupled to the at least one fiber in each accelerometer, and wherein the at least one fiber in each accelerometer comprises a Bragg grating thereon, such that an orientation with respect to Earth's gravity of a deflecting axis of each beam is determinable by measurement of a change in wavelength of light reflected by the Bragg grating.

17. The system of claim 10 further comprising:
three accelerometers, each accelerometer comprising a beam and at least one optical fiber affixed to one side of the beam such that deflection of the beam changes a length of the optical fiber, the at least three accelerometers oriented to be sensitive to acceleration at least in part along mutually orthogonal directions;
means for sensing the change in length of the optical fiber in each of the accelerometers; and
wherein the at least one fiber in each accelerometer comprises a Bragg grating thereon, such that an orientation with respect to Earth's gravity of a deflecting axis of each beam is determinable by measurement of a change in wavelength of light reflected by the Bragg grating, such that an orientation of the system with respect to Earth's gravity is determinable.

18. The system of claim 17 wherein the optical fiber in each accelerometer is the same fiber, the same fiber having a Bragg grating thereon where the same fiber is affixed to each beam, each Bragg grating reflecting a selected wavelength of light.

19. The system of claim 10 wherein each beam is supported so as to enable longitudinal movement when each beam is deflected.

20. A gravity orientation system, comprising:
three accelerometers, each accelerometer comprising a beam supported at the longitudinal ends thereof in a frame, and at least one optical fiber affixed to one side of the beam such that deflection of the beam changes a length of the optical fiber, the three accelerometers oriented to be sensitive to acceleration at least in part along mutually orthogonal directions; and
a Bragg grating on the at least one optical fiber in each accelerometer; and
means for measuring a wavelength of light reflected by each Bragg grating, such that an orientation with respect to Earth's gravity of a deflecting axis of each beam is determinable by measurement of a change in wavelength of light reflected by the Bragg grating, such that an orientation of the system with respect to Earth's gravity is determinable.

21. The system of claim 20 wherein three accelerometers are mutually orthogonal.

22. The system of claim 20 wherein each accelerometer beam comprises a reactive mass thereon.

23. The system of claim 20 wherein each beam is supported at both longitudinal ends so as to enable longitudinal movement when each beam is deflected.

24. A gravity orientation sensor, comprising:
at least one optical fiber having a Bragg grating thereon, the fiber operatively coupled to a mass, the mass mounted in a frame such that orientation of the frame with respect to Earth's gravity enables Earth's gravity to act correspondingly on the mass, the operative coupling of the fiber to the mass arranged such that a change in wavelength of reflected from the grating in the fiber corresponds to the action of Earth's gravity on the mass;
a snubber disposed on the frame such that action of Earth's gravity will result in corresponding change in length of the Bragg grating irrespective of orientation of the frame with respect to gravity; and
means for measuring a change in wavelength or period of the Bragg grating.

25. The sensor of claim 24 wherein the mass is suspended on the frame by linear bearings.

26. The sensor of claim 24 further comprising:
three frames oriented substantially orthogonally;
three masses each operatively coupled to a respective one of the frames such that Earth's gravity acts on each mass in relation to orientation of the corresponding frame with respect to gravity, the masses arranged to move substantially linearly along a corresponding frame;
a snubber disposed each frame such that action of Earth's gravity will result in corresponding change in length of the Bragg grating irrespective of orientation of the frame with respect to gravity;
a Bragg grating operatively coupled to each mass; and
means for measuring a change in length of each Bragg grating.

27. The sensor of claim 26 wherein the three Bragg gratings are formed on a single optical fiber.

28. A multicomponent seismic sensor system, comprising:
three accelerometers, each accelerometer comprising a beam supported at the longitudinal ends thereof in a sensor frame and at least one optical fiber affixed to one side of the beam such that deflection of the beam changes a length of the optical fiber, the three accelerometers oriented to be sensitive to acceleration at least in part along mutually orthogonal directions;
means for sensing the change in length of the optical fiber in each of the accelerometers;
three frames each having a direction substantially aligned with a sensitive direction one of the accelerometers;
three masses each operatively coupled to a respective one of the frames such that Earth's gravity acts on each mass in relation to orientation of the corresponding frame with respect to gravity, the masses arranged to move substantially linearly along a corresponding frame;
a Bragg grating operatively coupled to each mass; and
means for measuring a change in length of each Bragg grating.

* * * * *